United States Patent [19]

Wolf et al.

[11] 4,333,680

[45] Jun. 8, 1982

[54] VEHICLE SUNROOF INSTALLATION

[75] Inventors: Ernest Wolf, St. Louis; John Amos, Rolla, both of Mo.

[73] Assignee: Sky-Top Sunroofs Ltd., St. Louis, Mo.

[21] Appl. No.: 85,889

[22] Filed: Oct. 17, 1979

[51] Int. Cl.³ .............................................. B60J 7/00
[52] U.S. Cl. ..................................................... 296/216
[58] Field of Search ................ 296/216, 220, 221, 222

[56] References Cited

U.S. PATENT DOCUMENTS

| 2,190,462 | 2/1940 | Votypka | 296/216 |
| 3,066,976 | 12/1962 | Rehmann | 296/222 |
| 4,089,557 | 5/1978 | Leiter | 296/221 |

Primary Examiner—Joseph F. Peters, Jr.
Assistant Examiner—John A. Carroll
Attorney, Agent, or Firm—Sidney B. Ring; Hyman F. Glass

[57] ABSTRACT

This invention relates to a method of installing a sunroof in a vehicle which is characterized by the use of an adhesive to bond the sunroof to the vehicle roof. In the preferred embodiment certain mechanical devices are employed in conjunction with the adhesive to reinforce the bond of the sunroof to the roof of the vehicle. For example, mechanical devices, such as U or L trim rings in conjunction with the adhesive not only reinforce the bond between the vehicle roof and the sunroof, but also beautify by hiding the marred edges of the cut-away roof, as well as sealing the raw metal cut-away metal edges from moisture and corrosion.

This invention also relates to the combination of the sunroof installed in the vehicle in the above manner.

14 Claims, 3 Drawing Figures

VEHICLE SUNROOF INSTALLATION

Sunroofs, including both the lift type as illustrated by U.S. Pat. No. 4,161,336 and the sliding panel type as illustrated by U.S. Pat. No. 4,039,222, have enjoyed increasing popularity in recent years.

The installation of a sunroof, particularly of the sliding panel type, to a vehicle has always been more difficult and costly in what is known as the "aftermarket" as contrasted to the original vehicle production line. If not done "on line," the major problem has been the need to refinish the painted roof surface following installation.

"Aftermarket" installation methods for sunroofs heretofore known, have included procedures such as crimping of sheet metal, riveting, welding, or a combination of these. These procedures serve to destroy the integrity of the painted roof surface, requiring refinishing to avoid future rust development. To minimize refinishing needs, trim rings in both "L" and "U" configurations have been used to cover the damaged and refinished edges of the car roof, and to hide any mismatch between the original and refinished section.

The procedures developed to date are still relatively more time consuming and require special equipment that is quite expensive, compared to production line procedures.

We have now discovered a method of installing a sunroof in a vehicle which is characterized by the use of an adhesive to bond the sunroof to the vehicle roof.

In the preferred embodiment certain mechanical devices are employed in conjunction with the adhesive to reinforce the bond of the sunroof to the roof of the vehicle, such as by means of "U", "L", etc. channel trim rings. The reinforcing means, such as the U or L trim rings in conjunction with the adhesive forms a strong reinforced bond between the vehicle roof and the sunroof.

The present invention provides a system of procedures that will permit the aftermarket installation of a vehicle sunroof of any type, but particularly a sliding panel type, in a more time efficient manner, with less need for high cost special tooling or special skills, and with greater overall economy and speed. At the same time, the system of procedures of the present invention does not reduce any structural component strength below required levels nor compromise safety consideration important to the integrity of the customized vehicle.

This invention in its preferred application can be combined with a mechanical device such as a U-channel trim ring. The purpose of the trim ring is three-fold.

(1) Strength: the trim ring increases the structural strength of the edges of the vehicle roof and sunroof housing in two ways, by physically clamping around the edges to counteract separating forces, and by adding two additional layers of adhesive.

(2) Beauty: the trim ring hides the upper surface of the vehicle roof which may have been marred while cutting the roof opening.

(3) Moisture/Corrosion Protection: the trim ring seals the raw metal edge to protect it from moisture and therefore corrosion.

This invention has the following major features and advantages:

1. It simplifies the attachment of the sunroof housing to the vehicle roof.

2. It reduces the amount of special tooling required to carry out the installation procedure.

3. It speeds up vehicle turn-around and reduces cost of the installation procedure.

4. It can be carried out with a variety of suitable adhesive bonding systems, either two component or one component.

Without intending to limit the broad scope of the invention, but for purposes of illustration, the preferred embodiment of the invention is shown in the accompanying drawings where FIG. 1 is a perspective view of the interrelationship of the components of the invention, including the sunroof, the auto roof, and the top frame.

Figure 1:
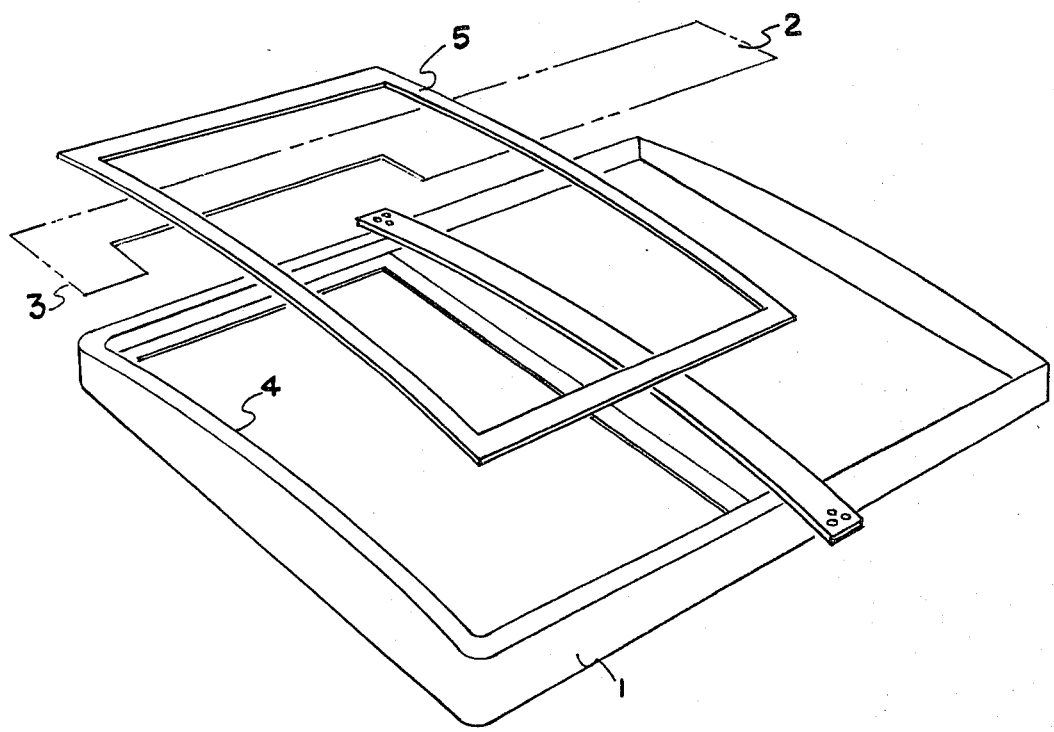
Figure 2:
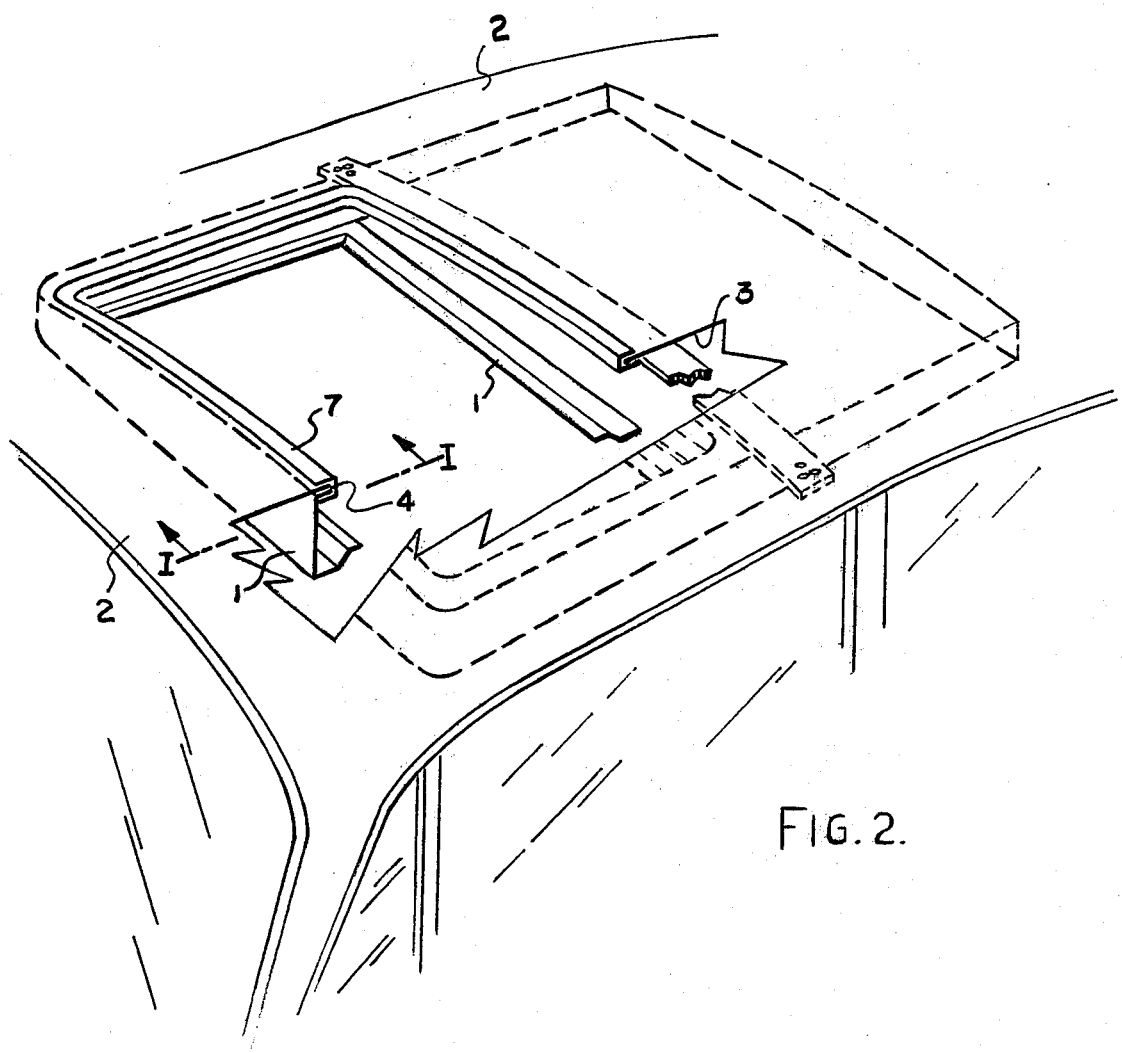
FIG. 2 is a perspective view of FIG. 1 in place in the auto roof showing a cross sectional cut-away along line 1—1.
Figure 3:
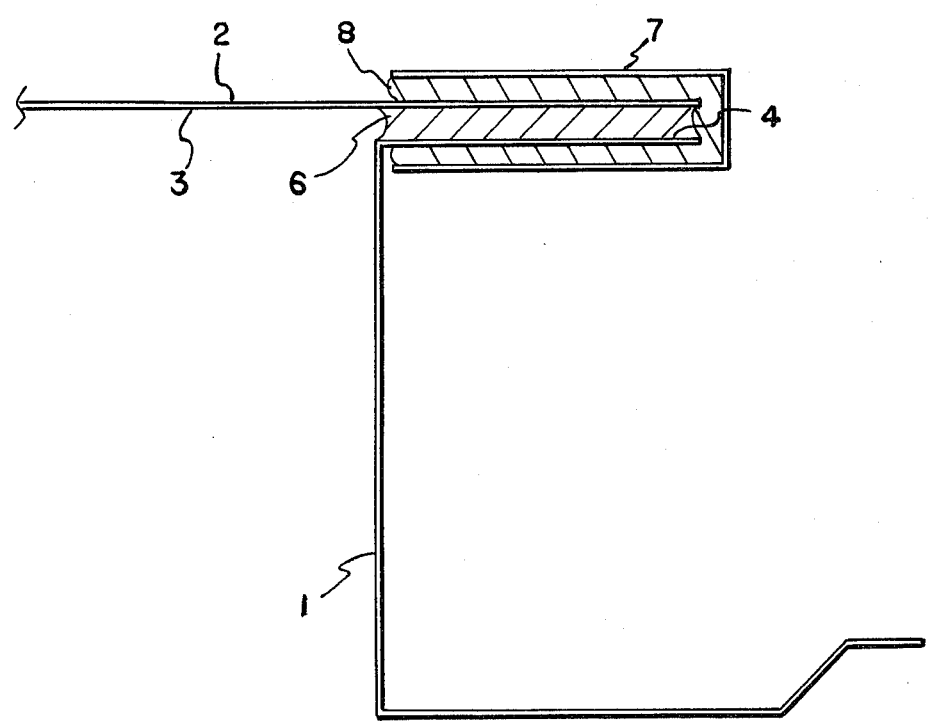
FIG. 3 is an enlarged cross sectional view of FIG. 2 along cut-away line 1—1 viewed in the direction of the arrows.

The process of the present invention may be summarized as follows:

1. An opening (hole) is made in the roof of the vehicle.

2. The housing (1) for a sunroof panel is attached to the vehicle roof (2) by adhesive bonding at the interface of the underside of the vehicle roof (3) and the upper surface lip (4) of the sunroof housing.

3. In a preferred procedure, a contoured frame (5) is laid on top of the vehicle roof (2) after the hole is cut. The inside edge of this contoured frame matches the inside edge of the hole. The shape of the contoured frame matches that of the sunroof panel to be installed in the opening. The panel is that part of the sunroof that opens and closes the roof opening.

4. The sunroof housing (1) has an inwardly projecting horizontal lip (4) at its upper surface. The inside edge of this lip (4) forms a hole for the panel and matches the hole cut into the vehicle roof.

5. A suitable bonding compound (6) is chosen from a variety of available bonding compounds. Examples of bonding compounds include thermosetting adhesives such as epoxies, thermoplastic adhesives such as cyanocrylates, rubber-based adhesives such as polyurethane or silicone adhesives, or one of many two-polymer adhesives presently on the market. A significant criterion is to choose a material providing a bonding strength of at least 1000 p.s.i. under normal ambient conditions. A preferred adhesive bonding material is a two part epoxy compound marketed by 3M Company known as Scotch Weld, 2216 B/A.

6. The surfaces to be bonded are prepared according to requirements set by the bonding compound (6) manufacturer, the compound is applied to one or both surfaces as necessary, and the surfaces are brought into contact with each other.

7. Clamps are applied to the top frame (5) and the housing (1), in effect applying pressure to the surfaces (3 and 4) to be bonded while maintaining contour control over the vehicle roof.

8. Heat may be applied in a controlled manner to a thermosetting bonding compound to shorten the cure time. In a preferred embodiment this time can be reduced to 15 minutes at 200° F.

9. The clamps and top frames (5) may now be removed and normal installation procedures carried on.

10. In a final step, a metal U-channel trim ring (7) is applied over the inward pointing raw metal edges of the bonded surfaces (3 and 4) to provide a finished appearance to the vehicle roof opening, and more importantly to provide a reinforcement to the mated adhesively bonded parts. Use of a structural sealant (8) in the course of this application, such as silicone, or other types of polyurethane sealants, serves to further strenghen the installation.

A wide variety of adhesives can be employed, providing they provide strong bonding between the vehicle roof and the sunroof. Non-limiting examples comprise both thermosetting and thermoplastic adhesives. In general, the thermosetting adhesives are preferred. Non-limited examples of thermosetting adhesives include the following:

Urea formaldehyde
Melamine formaldehyde
Urea formaldehyde+melamine formaldehyde
Phenol formaldehyde
Phenolic/epoxy resins
Resorcinol formaldehyde
Phenol formaldehyde+resorcinol formaldehyde
Epoxy (bisphenol A-based) resins+polyamine
Epoxy (bisphenol A-based) resins+polyaminoamide
Epoxy (bisphenol A-based) resins+polyanhydride
Epoxy/alkyl ester
Epoxy (cyclo-aliphatic)
Epoxy/bitumen
Polyester+polyisocyanate
Polyester+monomer+catalyst
Furane resins
Polyethylene imine
Polyisocyanate
Silicone resins.

While a specific embodiment of the invention has been shown for purposes of illustrating the invention, it will be apparent to those skilled in the art that various changes and modifications may be made without departing from the spirit of this invention.

We claim:
1. In combination
(1) a vehicle having an opening in the roof thereof, and
(2) a sunroof, said sunroof having panel means capable of opening and closing said opening,
the improvement wherein said sunroof is attached to the underside of the vehicle roof by means of an adhesive,
said sunroof being substantially coextensive to said vehicle roof, and
also substantially parallel to the sweep of the vehicle roof in the area of said adhesive attachment.
2. The combination as set forth in claim 1 wherein the sunroof is supported beneath the vehicle roof.
3. The combination as set forth in claim 2 wherein the sunroof is the sliding type.
4. The combination as set forth in claim 3 wherein the adhesive is employed in conjunction with a mechanical device.
5. The combination as set forth in claim 4 wherein the mechanical device encloses in whole or part the sunroof-vehicle roof adhesive contact area.
6. The combination as set forth in claim 5 wherein the mechanical device is U-shaped.
7. The combination as set forth in claim 6 wherein adhesive is located between opposing surfaces of the vehicle roof and sunroof and also on the adjacent opposite sides of said adhesive-laden opposing surfaces.
8. The combination as set forth in claim 7 wherein the adhesive between said opposing surfaces may be the same or different from the adhesive on opposite sides of said opposing surfaces.
9. The combination as set forth in claim 8 wherein said adhesive comprises polyurethane, silicone resin or urea formaldehyde.
10. In combination,
(1) a vehicle having an opening in the roof thereof, and
(2) a sunroof housing with attaching means, said sunroof housing having means capable of opening and closing said opening,
(3) said attaching means being attached with a bonding adhesive to the underside of the vehicle roof, and substantially coextensive therewith and also substantially parallel to the sweep of the vehicle roof in the area of the adhesive bonding.
11. The combination of claim 10 where the attaching means is a projecting lip.
12. The combination of claim 10 where the bonding adhesive is utilized together with means for reinforcing and trimming said bonding adhesive.
13. The combination of claim 10 where the attaching means is a projecting lip and the bonding adhesive is utilized together with means for reinforcing and trimming said bonding adhesive.
14. The combination of claim 13 where said reinforcing and trimming means is U-shaped.

* * * * *